US011611539B2

(12) United States Patent
Li et al.

(10) Patent No.: US 11,611,539 B2
(45) Date of Patent: Mar. 21, 2023

(54) METHOD, COMPUTER PROGRAM PRODUCT AND APPARATUS FOR ENCRYPTING AND DECRYPTING DATA USING MULTIPLE AUTHORITY KEYS

(71) Applicant: Auth9, Inc., Foster City, CA (US)

(72) Inventors: Hongjun Li, Newark, CA (US); Ning Xu, Foster City, CA (US)

(73) Assignee: Auth9, Inc., San Mateo, CA (US)

( * ) Notice: Subject to any disclaimer, the term of this patent is extended or adjusted under 35 U.S.C. 154(b) by 111 days.

(21) Appl. No.: 16/716,211

(22) Filed: Dec. 16, 2019

(65) Prior Publication Data

US 2020/0195621 A1   Jun. 18, 2020

Related U.S. Application Data

(60) Provisional application No. 62/814,119, filed on Mar. 5, 2019, provisional application No. 62/810,463, filed on Feb. 26, 2019, provisional application No. 62/780,300, filed on Dec. 16, 2018.

(51) Int. Cl.
*H04L 9/40* (2022.01)
*H04L 9/32* (2006.01)
*H04L 9/08* (2006.01)

(52) U.S. Cl.
CPC ........ *H04L 63/0435* (2013.01); *H04L 9/0836* (2013.01); *H04L 9/3226* (2013.01); *H04L 63/108* (2013.01)

(58) Field of Classification Search
CPC . H04L 63/0435; H04L 9/0836; H04L 9/3226; H04L 63/108; H04L 9/40; H04L 9/32; H04L 9/08; H04L 2463/061; H04L 2463/062
See application file for complete search history.

(56) References Cited

U.S. PATENT DOCUMENTS

| | | | | |
|---|---|---|---|---|
| 9,680,805 | B1 * | 6/2017 | Rodgers | H04L 47/70 |
| 10,298,551 | B1 * | 5/2019 | Perlman | G06F 21/602 |
| 2006/0010324 | A1 * | 1/2006 | Appenzeller | H04L 9/083 |
| | | | | 713/171 |
| 2006/0047960 | A1 * | 3/2006 | Ono | H04L 9/0891 |
| | | | | 713/171 |
| 2009/0169012 | A1 * | 7/2009 | Smith | G06F 21/57 |
| | | | | 380/277 |
| 2013/0339725 | A1 * | 12/2013 | Sabo | H04L 63/06 |
| | | | | 713/151 |
| 2014/0189808 | A1 * | 7/2014 | Mahaffey | G06F 21/31 |
| | | | | 726/4 |
| 2014/0365781 | A1 * | 12/2014 | Dmitrienko | G06F 21/34 |
| | | | | 713/185 |

(Continued)

*Primary Examiner* — Techane Gergiso
(74) *Attorney, Agent, or Firm* — Weaver Austin Villeneuve & Sampson LLP

(57) ABSTRACT

A method, apparatus and computer program product are provided for encrypting and decrypting data using multiple authority keys including receiving, from a first computing device, a data decrypt request to decrypt encrypted data, the data decrypt request comprising a user key, determining that the user key is associated with a key hierarchy that comprises a server key, decrypting the server key using the user key, decrypting the encrypted data using the decrypted server key and permitting access to the decrypted data by the first computing device.

17 Claims, 20 Drawing Sheets

(56) References Cited

U.S. PATENT DOCUMENTS

| | | | |
|---|---|---|---|
| 2016/0065370 A1* | 3/2016 | Le Saint | H04L 63/061 |
| | | | 713/155 |
| 2016/0087946 A1* | 3/2016 | Yang | H04L 63/0428 |
| | | | 713/171 |
| 2017/0063531 A1* | 3/2017 | Sullivan | G06F 21/45 |
| 2017/0078255 A1* | 3/2017 | Nejadian | H04L 9/083 |
| 2018/0176013 A1* | 6/2018 | Cheng | G06F 21/64 |
| 2018/0367316 A1* | 12/2018 | Cheng | H04L 9/3234 |
| 2020/0092090 A1* | 3/2020 | Lin | H04L 9/30 |

* cited by examiner

FIG. 11.

COMPANY

Jane Smith ▼

⊕ New
🔍 Search
📊 Income

Create Proof of Employment (Past Employee) — 1301

WEDNESDAY MARCH 18, 2018

PERSONAL DETAILS

FIRST NAME
John

LAST NAME
McClane

DATE OF BIRTH
05/23/1975

SSN
352-30-2419

EMAIL ADDRESS
jmcclane@gmail.com

PHONE NUMBER (OPTIONAL)

ENVELOPE — 1302

Platform certifies that:

- The envelope was sealed by the entity below.
- The content of this envelope has never been tampered with or modified by anyone since the time that the envelope was sealed.

COMPANY

SEALED ON MARCH 20, 2019 6:24 PM PST BY

| COMPANY | ESTABLISHED<br>Nov 11, 2021 | EIN-NUMBER<br>00-12345678 |
| INDUSTRY<br>Technology Services | REGISTRATION STATE<br>California | HEADQUARTERS<br>San Mateo, CA |

Email Past Employee — 1303

Copy Access — 1304

FIG. 13

METHOD, COMPUTER PROGRAM PRODUCT AND APPARATUS FOR ENCRYPTING AND DECRYPTING DATA USING MULTIPLE AUTHORITY KEYS

CROSS-REFERENCE TO RELATED APPLICATIONS

This patent application claims priority from U.S. Provisional Appl. Ser. No. 62/780,300, filed Dec. 16, 2018, U.S. Provisional Appl. Ser. No. 62/810,463, filed Feb. 26, 2019, and U.S. Provisional Appl. No. Ser. No. 62/814,119, filed Mar. 5, 2019, all of which are incorporated herein by reference in its entirety.

FIELD OF THE INVENTION

Embodiments of the present invention generally relate to encrypting and decrypting data, and, more particularly, relate to key generation and applications for using generated keys for various purposes, such as authentication, encryption, and/or other purposes for which keys are useful.

BACKGROUND OF THE INVENTION

It is common to encrypt data to provide security for the data. In conventional data encryption, the data to be encrypted is encrypted with an encryption key and that same key is capable of decrypting the data. The same encryption key may be shared among a group of users. However, the problem is that once the encryption key is compromised, for example, due to the actions of a single user, then the key shared by the group of users is also compromised because the same key is used.

Through applied effort and ingenuity, these and other problems with current encryption methodologies have been addressed by certain embodiments discussed herein.

BRIEF SUMMARY OF THE INVENTION

In general, embodiments of the present invention provided herein include systems, methods, apparatuses, and computer program products for encrypting and decrypting data, and managing multiple authority keys for use in managing data encryption and decryption permissions to one or multiple users, establishing encryption keys for each of the one or multiple users, and encrypting and decrypting data using the encryption keys owned by the one or multiple users. The present disclosure provides control of access to sensitive data through the use of one or multiple key sets comprising one or more unique keys associated with each user. In other words, each user is given a different key and each key is used to encrypt and decrypt data separately, resulting in multiple ciphers of the same data encrypted with different keys. For example, each user has a unique or different key set (e.g., user key and server key). In such an example, if one user's user key is compromised, the corresponding server key is invalidated or revoked by the system. In yet another example, a data owner may wish to revoke access to a particular user, and as such, the server key of the particular user is invalidated or revoked by the system according to the data owner's request. The present disclosure enables revocation of access permissions associated with a particular user, while continuing to enable permissions to other users. Such multi-key encryption and decryption improves security in controlling access to data, and improves other existing systems or processes that are "all-or-nothing" in that access to sensitive data is permitted via a single key distributed to multiple users.

In some embodiments, an apparatus for providing decrypted data comprising at least one processor and at least one non-transitory memory storing instructions that, when executed by the processor, configure the apparatus to receive, from a first computing device, a data decrypt request to decrypt encrypted data, the data decrypt request comprising a user key, determine that the user key is associated with a key hierarchy that comprises a server key, derive (e.g., decrypt) the server key using the user key, decrypt the encrypted data using the decrypted server key and permit access to the decrypted data by the first computing device. In another example embodiment, a hash algorithm may be used to derive the server key from the user key.

In embodiments, the apparatus is configured to determine that the user key is associated with the key hierarchy that comprises the server key and a plurality of other user keys and decrypt the server key using the user key or a key of at least one of the other user keys.

In embodiments, the apparatus is configured to determine that the user key is associated with the key hierarchy that comprises the server key and a plurality of other user keys, decrypt at least one of the plurality of other user keys using the user key, receive, from a second computing device associated with the at least one of the plurality of other user keys, a second data decrypt request to decrypt the encrypted data, receive from the second computing device, a second user key, and decrypt the server key using the second user key.

In embodiments, the apparatus is further configured to receive, from the first computing device, a password used to verify the identity of a user associated with the first computing device, derive a user key from the password, determine that the password derived user key is associated with the key hierarchy that comprises the encrypted server key and decrypt the server key using the password derived user key.

In embodiments, the apparatus is further configured to responsive to receiving, from the first computing device, the data decrypt request to decrypt encrypted data, transmit an authentication question to the first computing device, receive a reply to the authentication question, compare the reply to a corresponding answer and responsive to the reply matching the corresponding answer, derive a user key from the answer, determine that the answer derived user key is associated with the key hierarchy that comprises the server key and decrypt the server key using the answer derived user key.

In embodiments, the apparatus is further configured to permit access to the decrypted data based upon a time period falling within an allowed time period of an access rule.

In embodiments, the apparatus is further configured to permit access to the decrypted data based upon one or more access rules, wherein the one or more access rules indicate a maximum number of access requests permitted within a predetermined period of time.

Computer program products and computer implemented methods are also configured to implement embodiments of the present disclosure.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 11-19 show example displays that may be presented by one or more display screens of one or more machines, sometimes referred to herein as "computing devices," in accordance with some embodiments discussed herein.

DETAILED DESCRIPTION OF THE INVENTION

Figure 1:
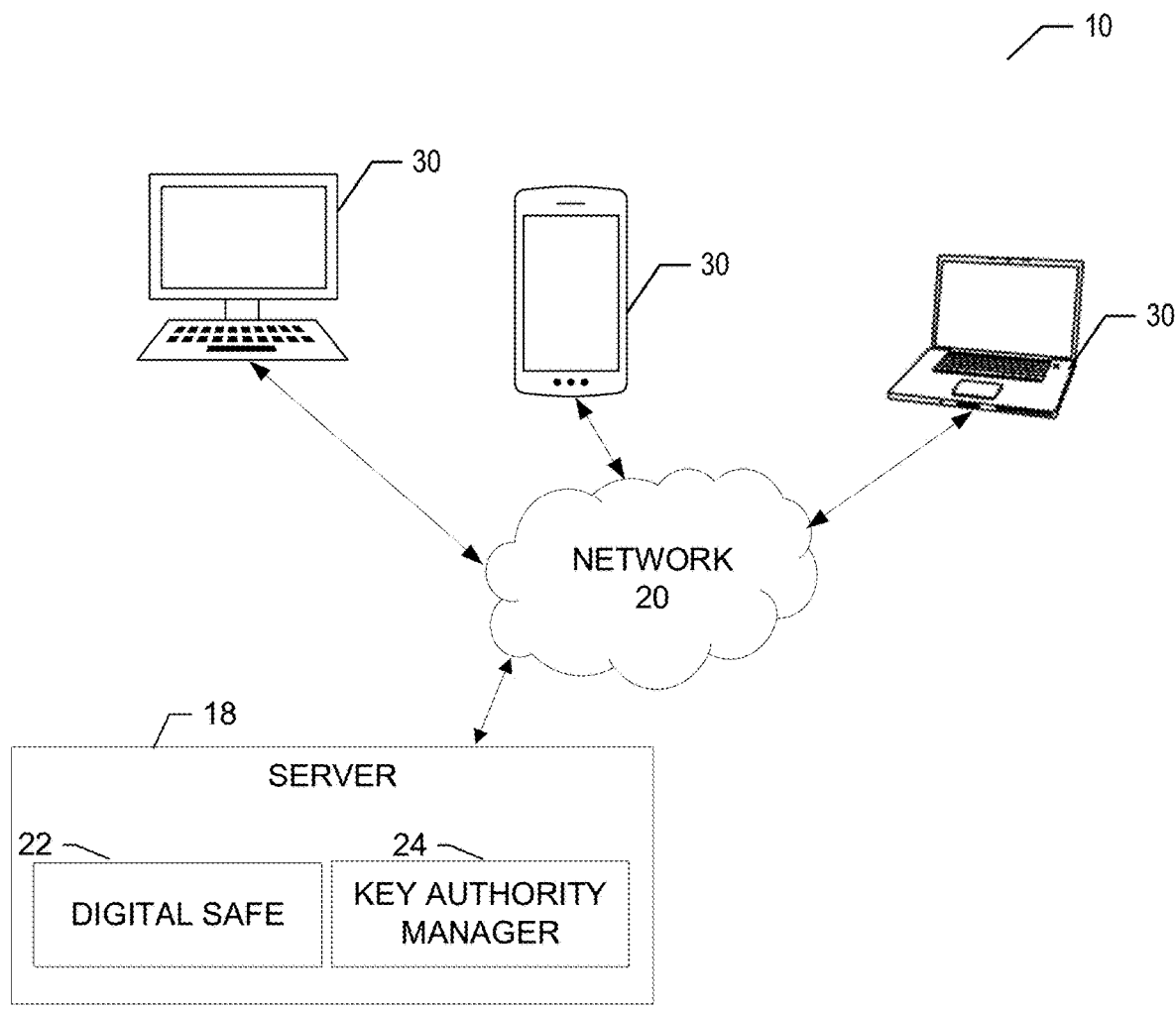
FIG. 1 is a basic block diagram illustrating a system that may benefit from exemplary embodiments of the present invention.

Embodiments of the present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

I. Overview

Various embodiments provide for encrypting data via a multi-level (e.g., two-level) encryption methodology. In certain embodiments, the encryption at each of the multiple encryption levels may utilize encryption keys such as symmetric keys or private/public key pairs. The encryption algorithm may comprise Advanced Encryption Standard (AES), Rivest-Shamir-Adleman (RSA), Elliptic Curves, and/or the like. The underlying data (e.g., a file to be encrypted, individual data to be encrypted, and/or the like) is encrypted with a first level encryption or master-level encryption, such as utilizing a master key which may be symmetric (e.g., only one secret key or master key to cipher and decipher data) or asymmetric (e.g., in combination with a master private/public key pair or two different keys to encrypt and decrypt data), which may be stored at a host server, however the master key or master encryption key need not itself be stored at the host server. At least a portion of encryption data associated with the master encryption key (e.g., the master encryption key itself) may itself be encrypted with a user key of a user-specific encryption key set associated with each user authorized to access the underlying encrypted data. In embodiments, the user-specific encryption key set or user key set comprises a user key (e.g., a user public key of a public key infrastructure (PKI) embodiment or a symmetric key) and a server key (e.g., a private key of a PM embodiment, a master key cipher, or the cipher of the master key encrypted by the user key). Such embodiments increase security against unauthorized access, because one user encryption key set becoming compromised does not affect the integrity of the other user encryption key sets. Various embodiments provide for encrypting data by requiring multiple user encryption key sets to encrypt/decrypt underlying encrypted data and to manage permissions to one or multiple users, comprising encrypting the data with a master key to provide a first level of encryption or master-level encryption, creating a second level of encryption or user-level encryption, the second level of encryption or user-level encryption comprises a user-specific encryption key set comprising a user key and a server key or master key cipher for each user and keeping both the server key and the master key secret from the users, with each user having a different user key set or user-specific encryption key set. Indeed, users (and their associated user devices) need not be aware of the existence of the master key or the server set, as user access to the underlying encrypted data is initialized by the user (through the user device) providing the user key to the central system, which then proceeds to decrypt the server key (e.g., master key cipher) and then the underlying encrypted data without further user input.

The system is further configured to encrypt the master key with each of the user keys (e.g., a user public key of a PKI embodiment) to provide a second level of encryption or user-level encryption. The user keys are provided to respective users, and the server keys are maintained in secret from the users. Additionally or alternatively, each user key is stored by the server and encrypted with each user's password. Thereafter, the system decrypts the sever key (e.g., master key cipher) using a respective, user key, thereby enabling decryption of the master key, which in turn enables decryption of the underlying data. The server key need not be made available to the user after decryption, thereby maintaining separate encryption/decryption keys for each of a plurality of users to access encrypted data, without requiring the data itself to be stored in multiple instances associated with each user.

In embodiments, the server may be configured to store metadata identifying the encrypted data file. This metadata may further identify user-added information and/or system added fields, such as a field which uniquely identifies the particular encrypted data file (e.g., data identification (ID)). The data in this metadata format may also include an identification of the server and/or encryption keys linked to the encrypted data file, and other fields, such as a digital signature associated with a certificate authority. Other types of fields may also be used.

II. Computer Program Products, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

III. Exemplary System Architecture

FIG. 1 is a basic block diagram illustrating a system 10 that may benefit from exemplary embodiments of the present invention. As shown and described herein, the system 10 could be employed in the context of a network 20 over which numerous electronic devices may communicate via wired, wireless or a combination of wired and wireless communication mechanisms. In an exemplary embodiment, the electronic devices may be embodied as personal computers (PCs) or other terminals that may enable individuals to run applications and/or communicate with each other in accordance with embodiments of the present invention. The network 20 may be any of a number of different communication backbones or frameworks including, for example, the Internet, a local area network (LAN), a personal area network (PAN), a campus area network (CAN), a metropolitan area network (MAN), or the like. In one exemplary embodiment, the server 18 could be part of a LAN or other localized network (e.g., associated with a particular company) and the server 18 may be in communication with the network 20 either directly or via a gateway device of the LAN.

a. Exemplary Server

Figure 2:
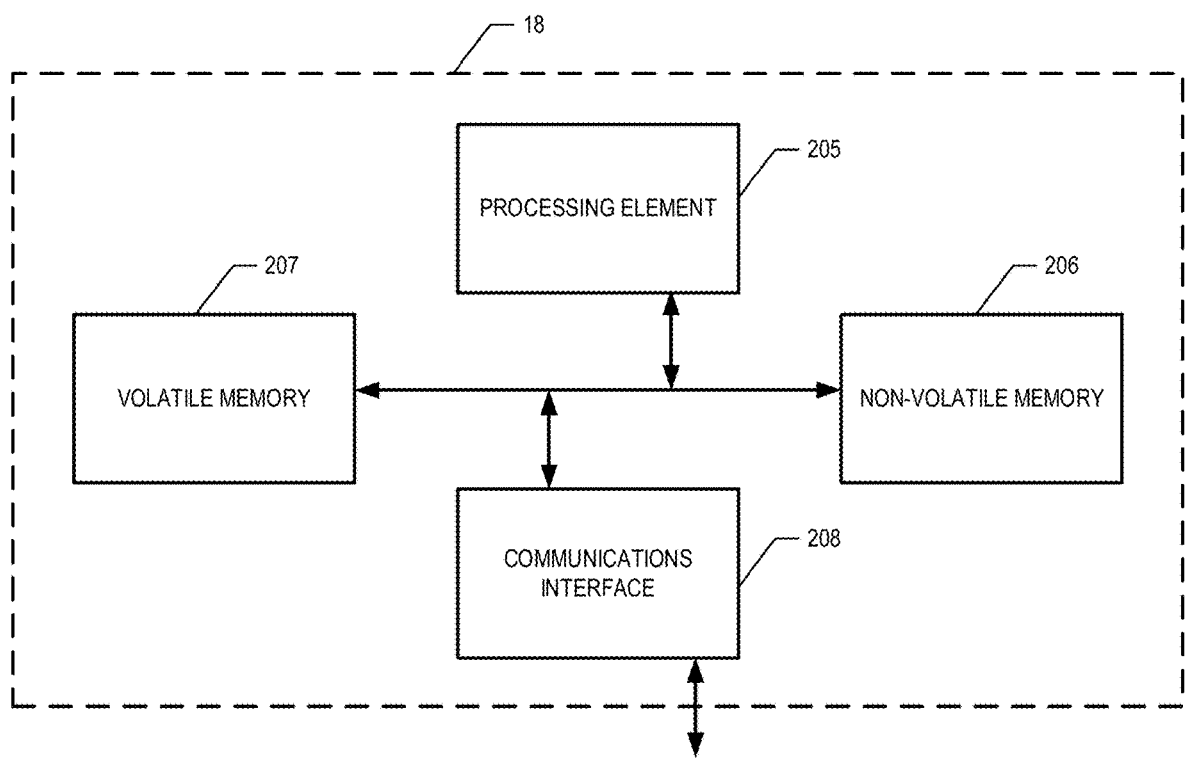
FIG. 2 illustrates a block diagram that may be specially configured in accordance with an example embodiment of the present disclosure.

The server 18 may be a server or other computing platform including memory and processing capability (e.g., the volatile memory 207 and the processing element 205 of FIG. 2) and in communication with the network 20 in order to facilitate operation in accordance with embodiments of the present invention. In some embodiments, the server 18 may host a verification app providing access to the functionalities, devices and/or elements described in connection with the server 18 below.

FIG. 2 provides a schematic of a server 18 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the server 18 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the server 18 may communicate with other analytic computing entities, one or more user computing entities 30, and/or the like.

As shown in FIG. 2, in one embodiment, the server 18 may include or be in communication with one or more processing elements 205 (also referred to as processors, processing circuitry, and/or similar terms used herein interchangeably) that communicate with other elements within the server 18 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the server 18 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 206 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Memory media 206 may also be embodied as a data storage device or devices, as a separate database server or servers (as shown in FIG.1), or as a combination of data storage devices and separate database servers. Further, in some embodiments, memory media 206 may be embodied as a distributed repository such that some of the stored information/data is stored centrally in a location within the system and other information/data is stored in one or more remote locations. Alternatively, in some embodiments, the distributed repository may be distributed over a plurality of remote storage locations only.

Memory media 206 may include information/data accessed and stored by the server 18 to facilitate the operations of the server 18. More specifically, memory media 206 may encompass one or more data stores configured to store information/data usable in certain embodiments.

In one embodiment, the server 18 may further include or be in communication with volatile media (also referred to as volatile storage, memory, memory storage, memory circuitry and/or similar terms used herein interchangeably). In one embodiment, the volatile storage or memory may also include one or more volatile storage or memory media 207 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 308. Thus, the databases, database instances, database management system entities, data, applications, programs, program modules, scripts, source code, object code, byte code, compiled code, interpreted code, machine code, executable instructions, and/or the like may be used to control certain aspects of the operation of the server 18 with the assistance of the processing element 205 and operating system.

As indicated, in one embodiment, the server 18 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the server 18 may communicate with computing entities or communication interfaces of other servers, terminals (e.g., user computing entities 30), and/or the like.

As indicated, in one embodiment, the server 18 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the server 18 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The server 18 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the analytic computing entity's components may be located remotely from other server 18 components, such as in a distributed system. Furthermore, one or more of the components may be aggregated and additional components performing functions described herein may be included in the server 18. Thus, the server 18 can be adapted to accommodate a variety of needs and circumstances.

b. Exemplary User Computing Entity

Figure 3:
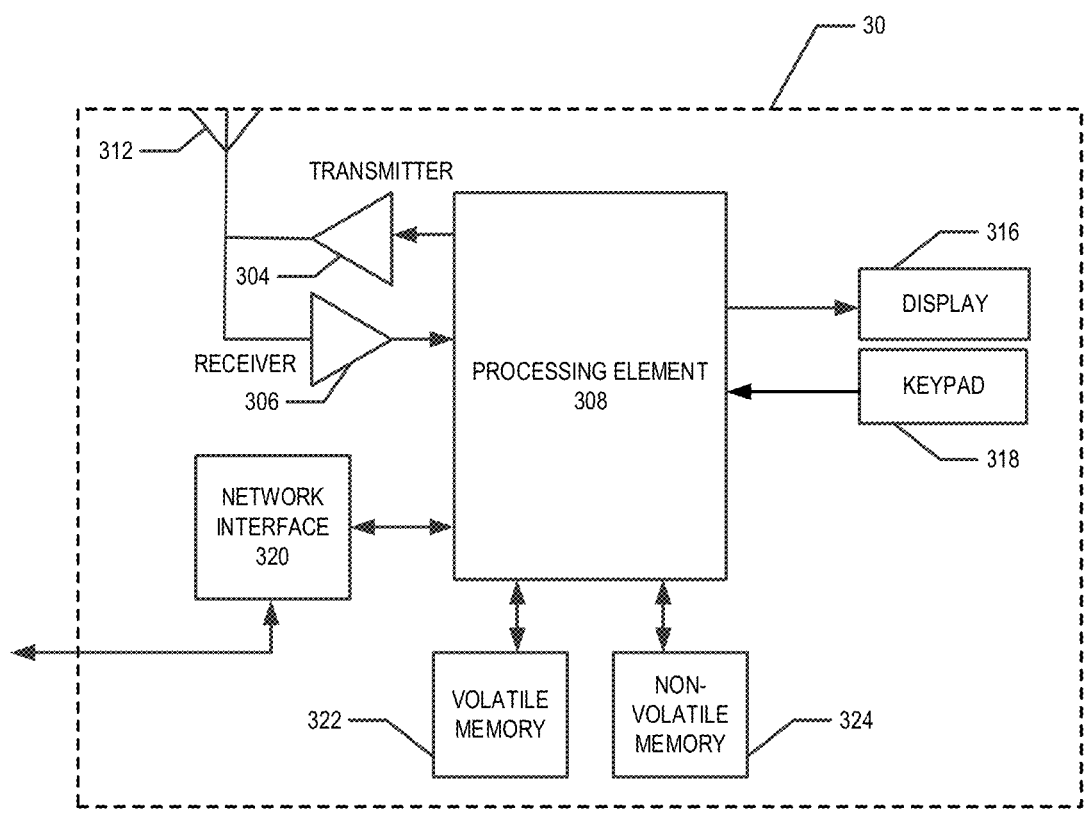
FIG. 3 illustrates a block diagram that may be specially configured in accordance with an example embodiment of the present disclosure.

FIG. 3 provides an illustrative schematic representative of user computing entity 30 that can be used in conjunction with embodiments of the present invention. As will be recognized, the user computing entity may be operated by an agent and include components and features similar to those described in conjunction with the server 18. Further, as shown in FIG. 3, the user computing entity may include additional components and features. For example, the user computing entity 30 can include an antenna 312, a transmitter 304 (e.g., radio), a receiver 306 (e.g., radio), a network interface 320, and a processing element 308 that provides signals to and receives signals from the transmitter 304 and receiver 306, respectively and/or the network interface 320. The signals provided to and received from the transmitter 304 and the receiver 306, respectively, may include signaling information/data in accordance with an air interface standard of applicable wireless systems to communicate with various entities, such as server 18, another user computing entity 30, and/or the like. In this regard, the user computing entity 30 may be capable of operating with one or more air interface standards, communication protocols, modulation types, and access types. More particularly, the user computing entity 30 may operate in accordance with any of a number of wired or wireless communication standards and protocols. In a particular embodiment, the user computing entity 30 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 30 can communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data/data may be determined by triangulating the position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 30 may also comprise a user interface comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 30 to cause display or audible presentation of information/data and for user interaction therewith via one or more user input interfaces. The user output interface may be updated dynamically from communication with the server 18. The user input interface can comprise any of a number of devices allowing the user computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 30 can collect information/data, user interaction/input, and/or the like.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 30.

c. Exemplary Server Modules

In various embodiments, the server comprises, amongst other elements, a digital safe 22 and a key authority manager 24. The digital safe 22 comprises one or more data stores, encryption keys, encryption data, and data owner information. Encryption keys may include digital information (e.g., data structure; one or more items of data; and the like) that determines the functional output of a cryptographic algorithm. An encryption key specifies the transformation of private data plaintext (or other plaintext) into private data ciphertext (or other ciphertext), and/or vice versa. In an example embodiment, the encryption key is a cryptography random number (e.g., 256-bit key). Encryption data includes a key hierarchy used to organize the encryption keys so that a master key is used to encrypt the private data and a user key is used to encrypt the master key to produce a server key (e.g., master key cipher). A key hierarchy provides a powerful pattern for storing cryptographic keys. The data owner information comprises information associated with the data owner (e.g., user associated with the user key), including for example a username, a password, a status (access permission temporary, access permission revoked, access permission restricted, etc.), and the like.

In an example embodiment, encrypted data is stored in the one or more data stores, and the user key is held by an authorized party (e.g., authorized data owners and/or data users), which in this case is an owner of user computing entity 30. Hence, only the owner, as holder of the user key, has access to the encrypted data. Data encryption can be performed at the user computing entity 30, or preferably at the server 18. In an example embodiment, the server 18 may operate with twice encrypted keys using the two-level encryption methodology. For example, the server 18 may encrypt a master key with a user key. The user may then provide the user key to decrypt a server key (master key cipher or encrypted master key) to get back the master which is used to decrypt the data.

The key authority manager 24 is configured to store and manage encryption keys as well as enforce permission policies. For example, the key authority manager 24 is configured to authenticate a data owner and/or data user prior to cryptographic processing of data. In an example embodiment, the server 18 is configured to implement one or more authentication methods such as, but not limited to, one time passwords or passphrases or a password recovery question and answer.

In some embodiments, a data owner may make their data available to other data users through permissions, which may entitle a data user to access the data according to various predefined rules. The key authority manager of server 18 may access digital safe 22 to determine if any permissions or entitlements exist from which access may be granted to the private, encrypted data, then retrieve an encryption key. The server 18 may provide an interface through which a data owner using a user computing entity 30 may identify the encrypted data to share and establish the rules and conditions for various permissions.

The sever 18 may also interact with a billing system to track access to the encrypted data when a permission is in place that causes a pay-for-access event to occur with an access. In an example embodiment, a data user may establish an account. The account may include payment information that may be debited to meet the terms and conditions of any permission that may be established to encrypted data. The server may then decrypt encrypted data and permit access to the data user when the terms and conditions are satisfied.

In embodiments where a user computing entity 30 is a mobile device, such as a smart phone or tablet, the user computing entity 30 may execute an "app" to interact with the server 18. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

d. Exemplary Networks

In one embodiment, the networks 20 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 20 may have any suitable communication range associated therewith and may include, for example, global networks (e.g., the Internet), MANs, WANs, LANs, or PANs. In addition, the networks 20 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

IV. Exemplary System Operation

Reference will now be made to FIGS. 3B, 4, 5, 6, 7, and 8, which illustrates various functionalities performed by the computing entities discussed herein. Certain embodiments as discussed herein utilize public-key cryptography, symmetric encryption (e.g., Advanced Encryption Standard (AES), and cryptographic hashing (e.g., Secure Hash Algorithm (SHA-256) or Password-Based Key Derivation Function 2 (PBKDF2)). although other encryption methodologies may be utilized in certain embodiments. Public-key cryptography may be utilized for key generation and data encryption as well as generating digital signatures and/or for authentication. Public-key encryption and/or digital signature schemes may be used include, without limitation, Rivest-Shamir-Adelman (RSA), Elliptic Curve, Quantum Safe algorithms, and/or the like. Encryption strength may be selected based at least in part on the selected encryption scheme and/or security requirements utilized.

a. Encryption/Decryption Structure and Process

Figure 3B:
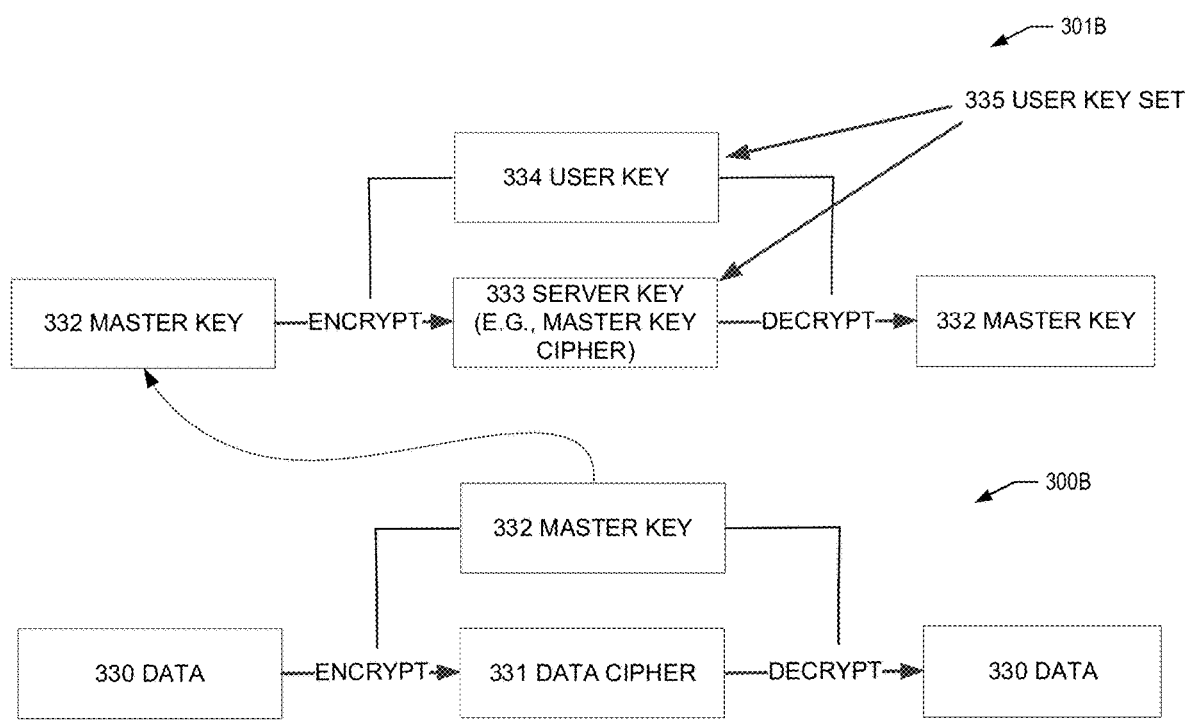
FIG. 3B is a basic block diagram illustrating a two-level encryption methodology having encryption keys that may benefit from exemplary embodiments of the present invention.

FIG. 3B illustrates encryption schemes that can be used to tighten security in encryption. 300B and 301B of FIG. 3B shows example cryptographic concepts using a master key encryption level and a user encryption level comprising one or many user keys. 300B involves one 332 master key to cipher 330 data and decipher 331 data cipher to get back 330 data. 332 master key may be a number, a word or a string of random letters. As shown by 301B, 335 user key set comprises 334 user key (e.g., a user public key of a PKI embodiment or a 256-bit random number as a symmetric key) and 333 server key (e.g., a private key of a PKI embodiment, a master key cipher of an asymmetric encryption, or a master key cipher of an asymmetric encryption using the user key 334). In an example embodiment, the 334 user key is used to encrypt 332 master key to produce 333 server key (e.g., a master key cipher). The 334 user key is used to decrypt 334 server key to get back 332 master key which is used to decrypt 331 data cipher to get 330 data. In an example embodiment, 333 server key is stored on the server and is inaccessible to a user.

Figure 4:
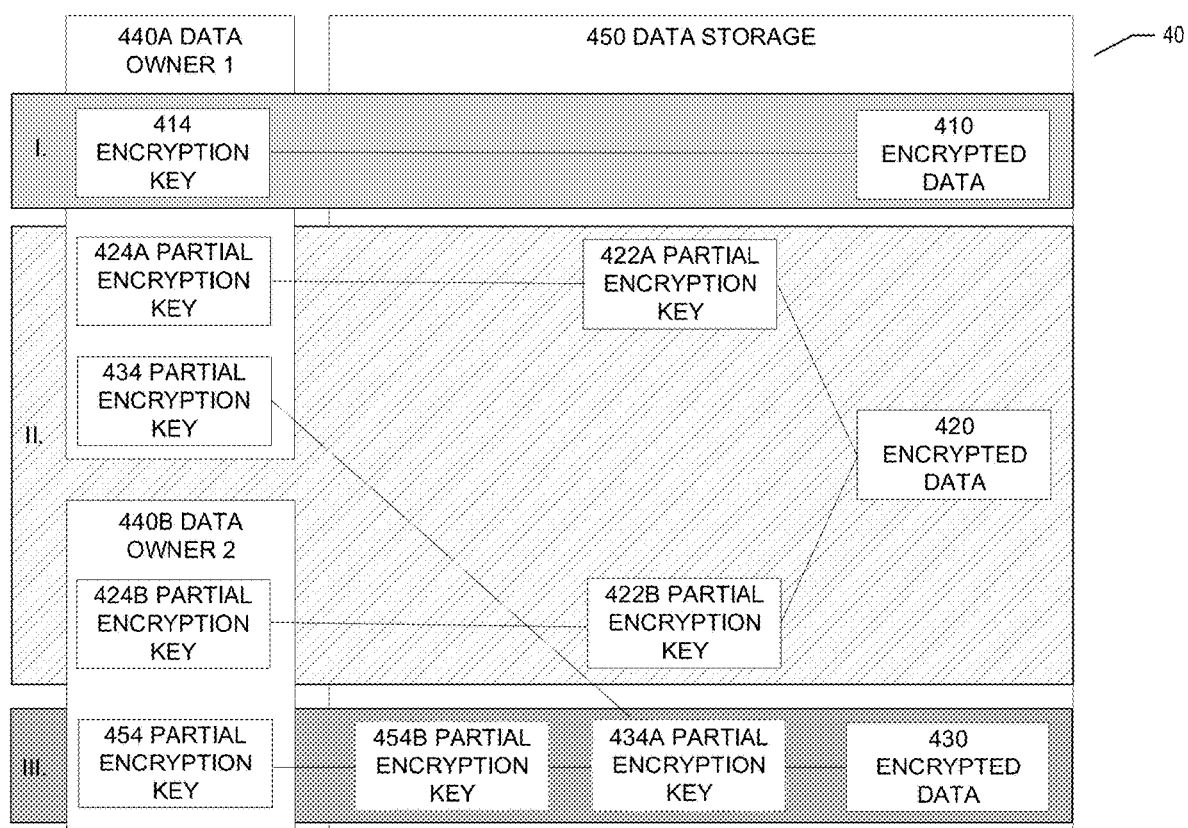
FIG. 4 is a basic block diagram illustrating encrypted data that may benefit from exemplary embodiments of the present invention.

FIG. 4 illustrates a structure 40 that presents a plurality (e.g., at least three) encryption key methods configured in a multi-tiered encryption service. As illustrated in FIG. 4, the structure 40 includes at least three different types of encryption methods (I., II., III). Encryption method I includes one encryption key 414 belonging to data owner 1 440A. In encryption method I, to decrypt the encrypted data 410 only one encryption key 414 is required. In this example, encryption key 414 may be considered the master key as in the previous example embodiment shown FIG. 3B.

Encryption method II includes partial encryption key 424A belonging to data owner 1 440A, partial encryption key 422A, encrypted data 420, partial encryption key 424B belonging to data owner 2 440B, and partial encryption key 422B. In encryption method II, to decrypt the encrypted data 420, partial encryption keys 424A and 422A or partial encryption keys 424B and 422B are required to decrypt encrypted data 420. In this example embodiment, even if one key or combination is compromised or expired it does not affect the other keys or combinations. In this example, partial encryption keys 424A and 424B may be considered as user keys (e.g., user public keys of a PM embodiment or symmetric keys) and 422A and 422B partial encryption keys may be considered as server keys (e.g., private key of a PM embodiment or ciphers of the master key encrypted by the user keys), wherein to decrypt the encrypted data 420, partial encryption keys 424A and 422A or partial encryption keys 424B and 422B are required.

Encryption method III includes partial encryption key 454 belonging to data owner 2 440B, partial encryption key 434 belonging to data owner 1 440A, encrypted data 430 and partial encryption key 454B and 434A. In encryption method III, to decrypt the encrypted data 430, partial encryption keys 454B and 434A are required to decrypt encrypted data 430. In this scenario, more than one key from more than one owner is required to decrypt encrypted data 430. In this case, partial encryption keys 454 and 434 may be considered as user keys and 454B and 434A partial encryption keys may be considered as server keys, wherein to decrypt the encrypted data 430, two user keys (434 and 454) and one server key (454B) are required. In another embodiment, partial encryption key 454 is a symmetric key that is used to decrypt 454B to get 434A, wherein 434 is another symmetric key that is used to decrypt 434A to get back the master key.

As shown in FIG. 4 encrypted data comprising sensitive data (410, 420, and 430) is saved in a data store 450. As shown in FIG. 4 and described herein, the encryption algorithms can be one-key encryption as shown by example encryption method I, in which decryption of the encrypted data 410 requires only one encryption key 414. In another example embodiment, the encryption algorithm can also be two-key or multiple-key encryption. For example, the encrypted data 420, as shown by example encryption method II, requires two keys 424A and 422A to decrypt the encrypted data 420. Multiple keys or key sets/combinations can be used to encrypt/decrypt the same data 420. For example, keys 424B and 422B can also decrypt data 420, as well as keys 424A and 422A. As a result, even if one key or combination is compromised or expired it does not affect the other keys or combinations.

In another example embodiment, the data store 450 can save some encryption keys like 422A and 422B but it should never store all the keys enough to decrypt the data. Additionally or alternatively, users' keys (414, 424A, 434, 440B, and 454) may be stored as encrypted keys with a key that only the user possesses (e.g., a password) in data store 450. Encryption keys may also be saved by data owners 440A and 440B, which are required to decrypt data saved in the data store 450. In an example embodiment, data owners 440A and 440B are individuals or groups of individuals who own the data or have authority over the data. For example, customers of an e-commerce website can be owners of credit card data. Encrypted data in a data store 450 can only be decrypted by the keys saved by the owners and the keys saved in the data store 450. Some data in the store 450 can be decrypted with keys from one owner. For example, data 410 can be decrypted with key 414 of data owner 1 440A; data 420 can be decrypted either by key 422A of data owner 1 440A, or key 422B of data owner 2 440B. Some data in the data store 450 requires keys from more than one owner to decrypt. For example and as shown as encryption method III, data 430 requires key 434A from data owner 1 440A and key 454B from data owner 2 440B to decrypt data 430. In another example embodiment, one key or combination can be used to encrypt multiple pieces of data. For example, key 414 is used to encrypt data 410 as in FIG. 4. Key 414 can also be used to encrypt other data in the same data store 450 or other data stores.

Figure 5:
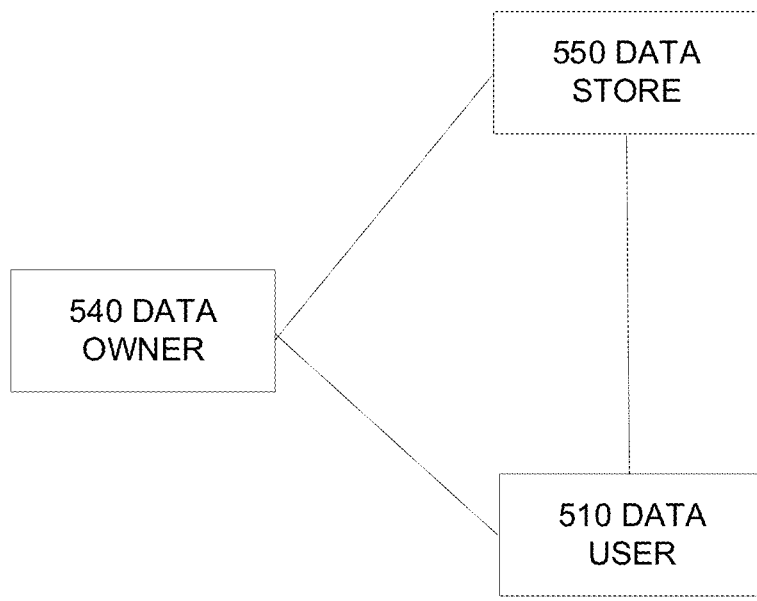
FIG. 5 is a basic block diagram illustrating a data owner, data store, and data user that may benefit from exemplary embodiments of the present invention.

FIG. 5 illustrates the processes to decrypt and use the data saved in the data store 550. For example, a data user 510 is a party entity who needs access to data stored in data store 550 (e.g., an e-commerce website which needs to get a user's credit card information to finish a purchasing process). At least part of the data can be decrypted by either data owner 540 by sending his encryption keys to data store 550 to which data store 550 does the decryption. In another example embodiment, the data store 550 sends its encryption keys and the encrypted data to the data owner 540 and the data owner 540 does the decryption. In these cases, at least a part of the decrypted data can be sent to the data user 510 by either the data owner 540 or the data store 550. The process to decrypt the data can be initiated by either data user 510 asking or requesting the data owner 540 for access to data in data store 550, or by the data owner 540 sending the data to the data user 510.

Figure 6:
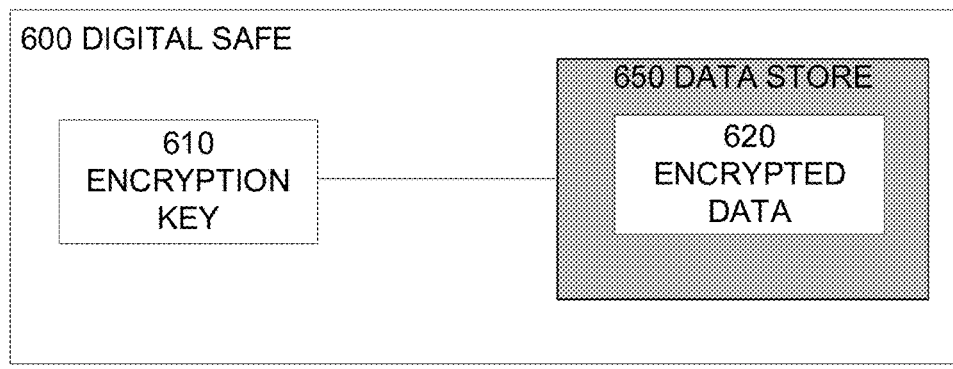
FIGS. 6 and 6a are basic block diagrams of a digital safe that may benefit from exemplary embodiments of the present invention.
Figure 6A:
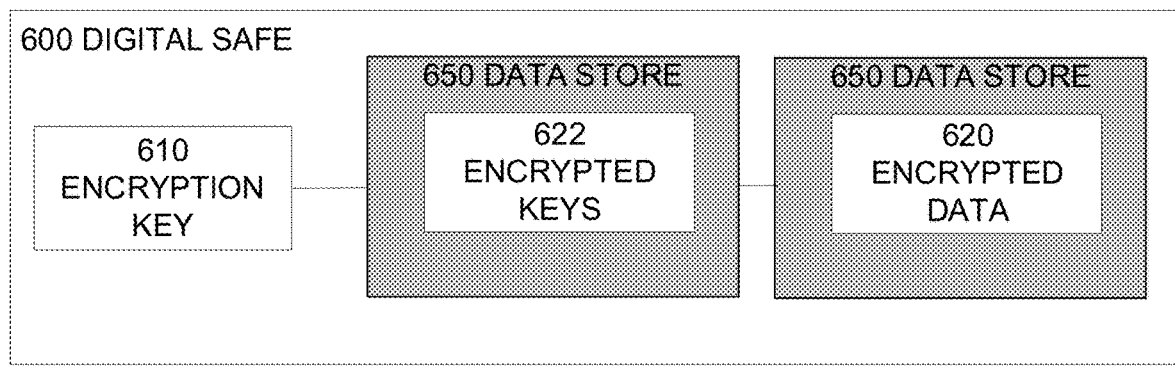

In another example embodiment the three entities in FIG. 5 can be combined. For example, as shown in FIGS. 6 and 6A, a data store 650 and a data user can be managed as one entity/party. In another combination, a data owner and a data store 650, can form a digital safe 600 as shown in FIGS. 6 and 6A. In these example embodiments, there is at least one owner encryption key 610 that can be used to decrypt data 620 (saved and encrypted in a data store 650). The data store 650 can be on a mobile device (e.g., a mobile phone, a laptop, or a desktop computer), or the data store 650 can be an online service. An encryption key 610 can be derived from the data owner's password or passphrase. It is easier to remember a password or passphrase than an encryption key. The data in the digital safe 600 may include any data like credit card, social security number (SSN), website logins, other passwords/secrets, medical history, etc. When the data owner needs to disclose or provide access to the data in a digital safe 600, the data owner may decrypt the data 620 with his or her encryption key 610 and send it to a data user 510 as in FIG. 5. The password/passphrase and the encryption key 610 may not be saved, at least not in the data store 650. In another example embodiment of digital safe 600 includes separately saving encrypted data 620 and the data encryption keys 622 into separate data stores 650, as shown in the bottom by FIG. 6A to provide even further security.

Figure 7:
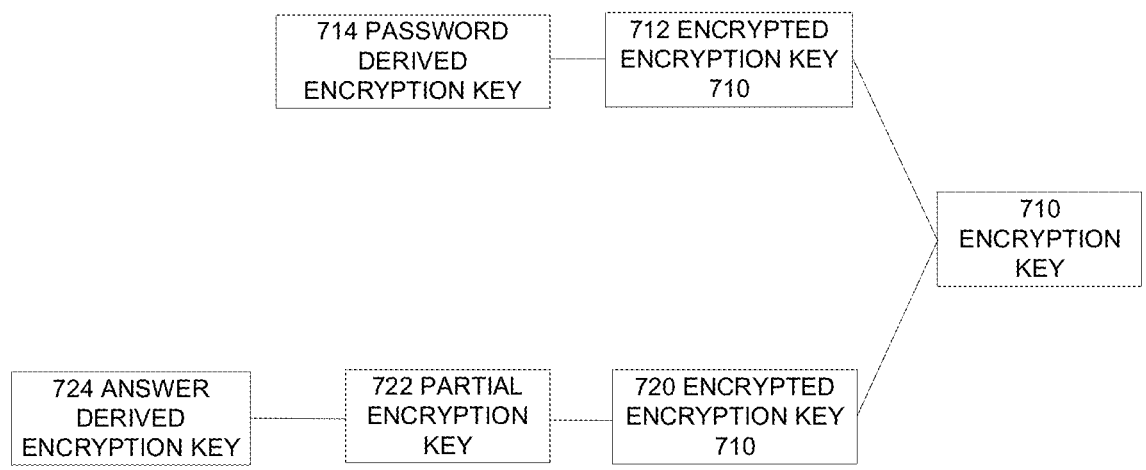
FIG. 7 is a basic block diagram of an exemplary password recovery data flow in accordance with an example embodiment of the present disclosure.

As discussed herein, the system may implement and save a user's password recovery questions and answers. As shown in FIG. 7, in one embodiment the encryption key 710 may be encrypted in two ways. In the first example, encryption key 710 is encrypted with a password derived encryption key 714 to get the result 712 which is the encrypted encryption key 710. The result 712 which is the encrypted encryption key 710 may be saved in the digital safe 600. In this example, a data user is able to decrypt the data in the digital safe 600 if he remembers his password. In the second example, the encryption key 710 may be encrypted with two-keys (answer derived encryption key 724 and partial encryption key 722) from 720 which is the encrypted encryption key 710, in case the data user forgets his or her password. Both keys 724 and 722 are required to recover the encrypted encryption key 710. Encryption result 720 can be saved in the digital safe 600 or data store 650. One of the keys 724 and 722 can be derived from a user's password recovery questions and answers. For example, 724 can be derived from the recovery questions and answers; the other key, for example key 722, is saved by the data user, for example, in his mobile device.

In case the data user forgets his or her password, he or she may provide at least his or her answer(s) to the question(s) to derive key 724 and his or her recovery key 722. With these two keys (724 and 722), the encrypted encryption key 720 can be decrypted to get the encryption key 710. A new encrypted encryption key can be created with a newly reset password. The old encryption key can be deleted. In these examples, the encryption key is never saved, only its encrypted form 712 and 720 are saved. Since the data user needs to provide both encryption keys 724 and 722, which he can save on his device, and answers to password recovery questions, it is less likely that both of encryption keys 724 and 722 are compromised. In an example embodiment, all the data saved in a data store 650 is encrypted with encryption keys either not saved at all and instead derived from the data owner's password and/or recovery questions or kept separately by the data owners. As such, sensitive data is not compromised even in the case when a data store 650 is hacked and sensitive data is stolen.

i. Single Key Decryption Where Only One Key Set is Required

Figure 8:
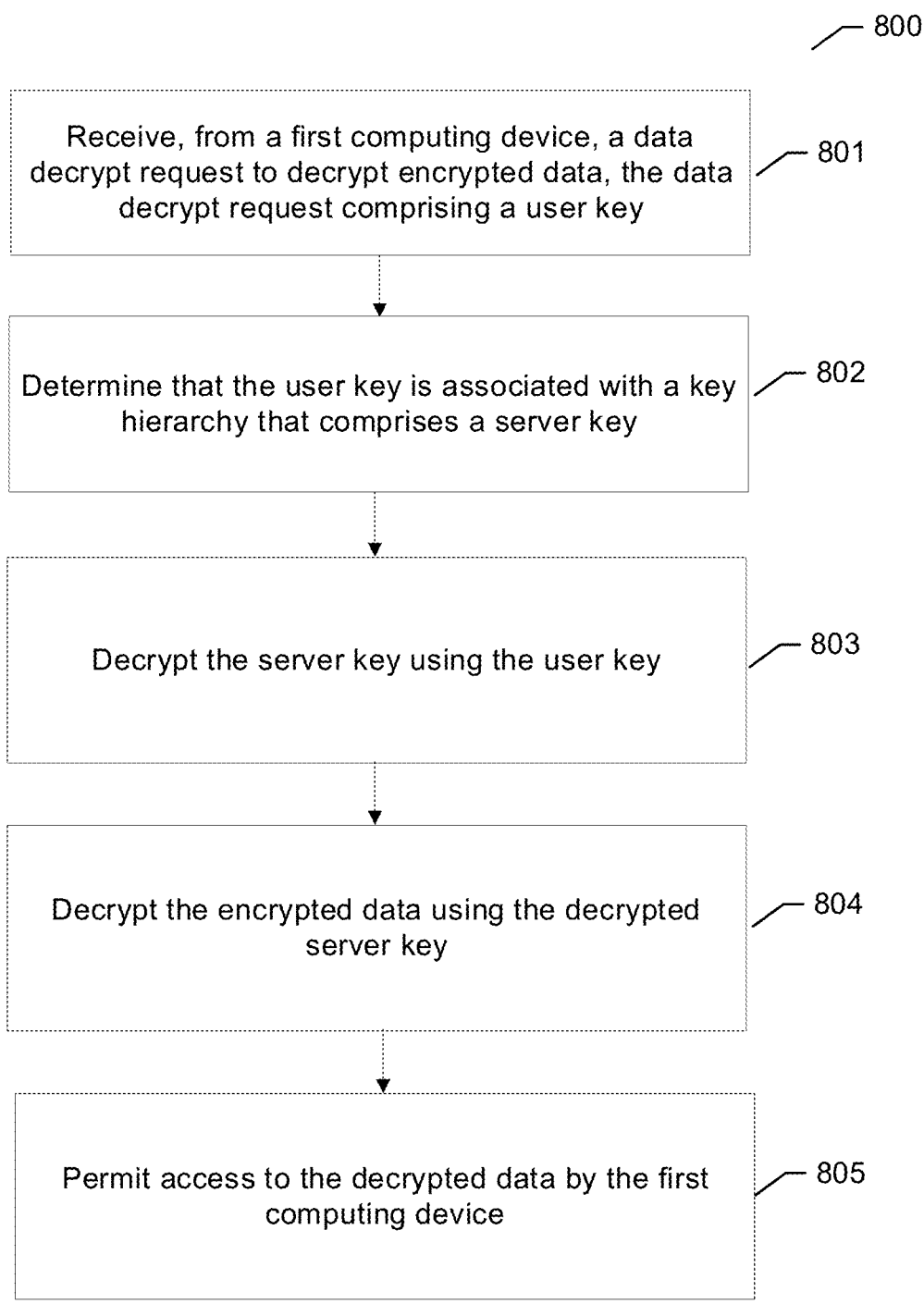
FIG. 8 illustrates an exemplary user authorization and permissions data flow in accordance with an example embodiment of the present disclosure.

FIG. 8 illustrates an exemplary data flow for decrypting encrypted data, according to one embodiment of the present disclosure. In embodiments, routine 800 begins in block 801 with server 18 receiving, from a first computing device, a data decrypt request to decrypt encrypted data, the data decrypt request comprising a user key. In an example embodiment, the user key refers to a random string, number, or other random data value.

In block 802, routine 800 continues with server 18 determining that the user key is associated with a key hierarchy that comprises a server key (e.g., master key cipher or encrypted master key). In embodiments, the server key may be a symmetric key, a private key of a PKI embodiment, a cipher, and/or the like. In an example embodiment, the user keys may be distributed according to an organizational hierarchy. In particular, the user keys are distributed to correspond with access rights of those in the organizational hierarchy such that a data owner must first provide permissions to other users before the other users can access the data. In an example embodiment, the user keys may be distributed such that a data owner with a user key in the hierarchy is able to decrypt data shared to a group of users. In this manner, if a key is lost or otherwise inaccessible, a user key from another group member will be usable to decrypt the data.

In block 803, routine 800 continues with server 18 decrypting the server key using the user key. In block 804, routine 800 continues with server 18 decrypting the encrypted data using the decrypted server key. In other words, the user key is used to decrypt the server key to get the master key which is used to decrypt the encrypted data.

In block 805, routine 800 continues with server 18 permitting access to the decrypted data by the first computing device. Additionally or alternatively, in some embodiments, the server 18 may grant permission to the decrypted data in real-time. For example, the data owner may transmit sensitive data to the server 18 by secure means. In response, the server 18 may create the master key in which the sensitive data is encrypted using the master key. The server 18 may store the encrypted data. The server may then create a user-specific encryption key or user key in which the user key is used to encrypt the master key. In embodiments, the user key is transmitted to the data owner. In an instance when a friend of the data owner requests access to the sensitive data, the friend may send an access request to the server 18. The server will then request permission from the data owner to provide access to the friend. In this case, the data owner may grant permission by transmitting his/her user key to the server 18. The server 18 will then decrypt the server key (e.g., master key cipher) using the user key and the encrypted data is decrypted using the resulting master key (e.g., decrypted server key or decrypted master key cipher). In an example embodiment, the server 18 may send the decrypted data to the friend. Additionally or alternatively, the server 18 may create a new user-specific encryption key to be used to provide access to the friend.

In an example embodiment, the server 18 may permit access to the decrypted data based upon a time period falling within an allowed time period of an access rule. In another example embodiment, the server 18 may permit access to the decrypted data based upon one or more access rules, wherein the one or more access rules indicate a maximum number of access requests permitted within a predetermined period of time.

ii. Two Key Decryption/Multiple Key Decryption

In another example embodiment, the server is configured to determine that the user key is associated with the key hierarchy that comprises the server key and a plurality of other user keys. In an example embodiment, each of the other user keys may grant permission to access/decrypt the encrypted data to another user, such as when encrypted data may be accessible via multiple keys. In another embodiment, a single key may be used to encrypt and decrypt data. As a concrete illustrative example, if the encrypted data is a proof of employment form, the server may provide access to a particular user, but not, without permission from the owner. In this case, the owner may provide access to other user to his or her proof of employment form.

Once the key hierarchy is determined, the server 18 may be configured to decrypt the server key using the user key or a user key of at least one of the other users.

In another example embodiment, the server may be configured to determine that the user key is associated with the key hierarchy that comprises the server key and a plurality of other user keys. The server 18 may then be configured to retrieve the server key in order to using the corresponding user keys. The server is then configured to receive, from a second computing device associated with the at least one of the plurality of other user keys, a second data decrypt request to decrypt the encrypted data. In this example, permission from the second computing device is required before decrypting the encrypted the data.

In an example embodiment, the server is configured to receive from the second computing device, a second user key and decrypt the server key using the second user key.

In other words, for a multiple key encryption process, sensitive data is encrypted with a master key. The server 18 is then configured to create one or more encryption key sets for each user, each user having a different encryption key set. The user key is used to encrypt the master key. The user key is provided to each of the users. Additionally or alternatively, the server 18 may store the user key as an encrypted user key associated with the user's password. Each user is associated with a different user key. In an example embodiment, the encrypted data is saved by the server. The server 18 may also save the server key (e.g., encrypted master key or master key cipher). The master key may not be saved to the server.

Additionally or alternatively, the server 18 may not save the master key. In this case, the server 18 generates the master key and encrypts the sensitive data and saves the encrypted data in storage. The server 18 is then configured to generate a user key and save the user key in storage, such as data store 650 using a password from the corresponding user. The server 18 is then configured to encrypt the master key with the user key and send the user key to the user. Server 18 may then discard or destroy the master key. In this example embodiment, the user with the user key is the only user with permissions to decrypt the sensitive data. In order to grant permission to other users, the user with the user key can transmit the user key to the server 18 so that the server 18 can retrieve the corresponding server key in order to create another encryption key set for one or more other users.

In some embodiments, at least three different user-specific encryption keys from three different users or parties are needed for verifying permissions to access sensitive data. In this case, the server 18 receives a user key (e.g., keyN-1) from a first user. keyN-1 from the first user is used to decrypt encrypted user key e_keyN-1 to get the user key of keyN-2. User key keyN-2 is then used to decrypt encrypted user key keyN-2 to get user key keyN-3. KeyN-3 is then used to decrypt the master encryption key to decrypt the encrypted data protected by these multiple keys. In this case, all the keys are required to decrypt the encrypted data.

iii. Single Key Encryption Where Only One Key Set is Required

Figure 9:
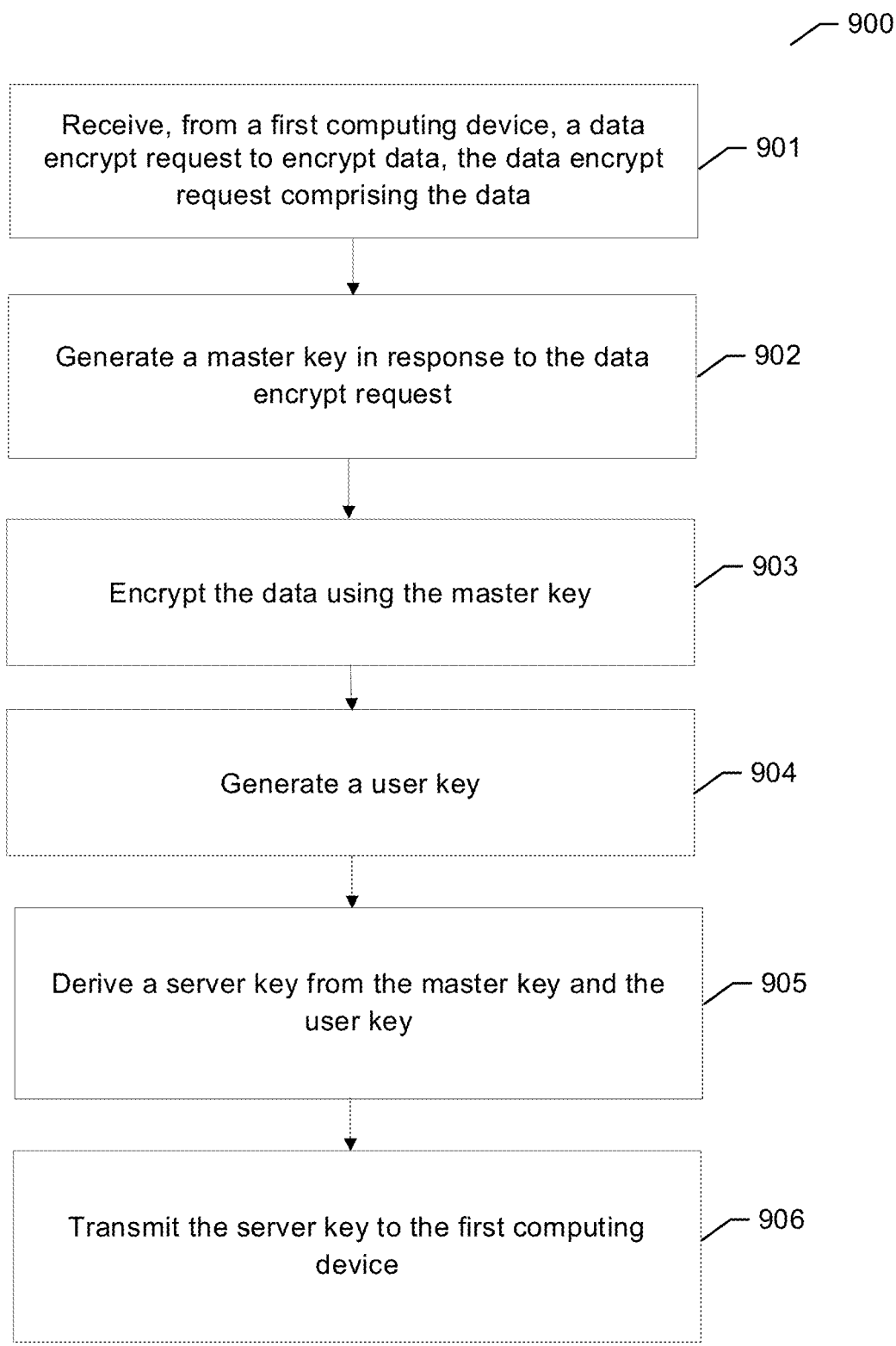
FIGS. 9 and 10 illustrate flowcharts depicting various operations performed in in accordance with an example embodiment of the present disclosure.

FIG. 9 illustrates an exemplary data flow for encrypting data, according to one embodiment of the present disclosure. In embodiments, routine 900 begins in block 901 with server 18 receiving, from a first computing device, a data encrypt request to encrypt data, the data encrypt request comprising the data. In response server 18 is configured to generate a master key in response to the data encrypt request as shown in block 902. The server is then configured to encrypt the data using the master key as shown in block 903.

In an example embodiment, routine 900 continues in block 904 with server 18 generating a user key. In block 905, the server 18 is configured to derive a server key from the master key and the user key. In an example embodiment, routine 900 continues in block 906 with server 18 transmitting the user to the first computing device. Additionally or alternatively, the user key is encrypted with the user's password and saved to server 18.

iv. Two Key Encryption/Multiple Key Encryption

In another example embodiment, the server 18 is configured to implement a multiple key decryption process. For example, a data owner may send data to the server 18 for encryption services. The server 18 is configured to create a master key and encrypt the data with the master key. In an example embodiment, the server 18 is further configured to save the encrypted data in storage. The server 18 is then configured to create a user key and derive a server key from the master key and the user key. The server 18 may be configured to destroy the master key and send the corresponding public key of the user key set to the data owner.

In an instance when another user wants access to the data, the sever 18 may send a permission request to the data owner. The permission request may include information related to another user (e.g., data requesting user). The data owner may grant permission for another user to access the data by transmitting the user key to the server 18. The server 18 may then be configured to decrypt the encrypted master key using the user key. The decrypted master key is then used to decrypt the data. The decrypted data may then be transmitted to another user. Additionally or alternatively, the server 18 may be configured to create another user key set for another user to grant permission to the encrypted data. In this case, the master key may be destroyed and the newly created user key set may be used to decrypt the encrypted data.

In yet another example embodiment, server 18 may be configured to create the master key, encrypt the sensitive data with the master key to produce the encrypted data. The sever 18 may then be configured to create a user key, and derive a server key from the master key and the user key. The user key is provided to the user. After providing the user key to the user, the server 18 may be configured to discard or destroy the master key. The server 18 may then be configured to retrieve the corresponding server key in order to create another encryption key set for one or more other users. The corresponding user key of another user key set is provided to another user. The server 18 may then be configured to discard or destroy the user key set. The steps of creating user key sets, using the created user key sets to encrypt user keys, and destroying the keys associated with the encrypted keys may continue until the required number of encryption keys for the required number of users is reached. The last key being e keyN-1 given to the last user as an encryption key, where N is the number of users.

In this example embodiment, the N keys are user-specific key1, user-specific key2, . . . , user-specific keyN-1, user-specific e_keyN-1. The master key and all the intermediate encrypted keys user-specific e_key 1, user-specific e_key2, user-specific e_keyN-2 are discarded. The encrypted data can be saved by any or all users, or by the server. To decrypt the data, user-specific keyN-1 is used to decrypt user-specific e_keyN-1 to get e user-specific keyN-2, user-specific keyN-2 is used to decrypt user-specific e_keyN-2 to get user-specific e_keyN-3, this process continues until user-specific key1 is used to decrypt user-specific e_key1 to get the master key. The master key is used to decrypt the encrypted data to get the original data to be protected by multiple keys. In this case, all the user-specific N keys are required to decrypt the data.

Example Use Cases

Figure 10:
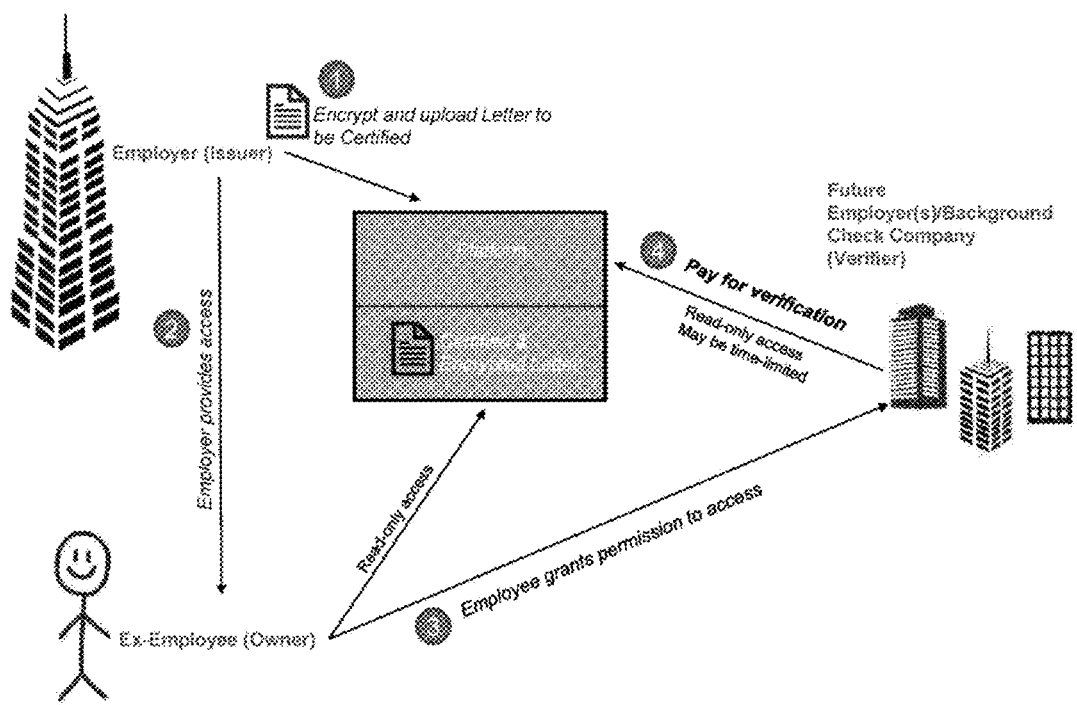

FIG. 10 illustrates an exemplary use case in accordance with example embodiments of the present disclosure. With regards to conducting background checks, certified entities such as schools and/or employers may provide certified sealed assets such as a graduation certificate, employee work history, transcripts, and the like. It should be understood that analogous methodologies may be utilized for the exchange of other sensitive information, such as credit card information, insurance information, identifying information (e.g., driver's license information), membership information, and/or the like. For example, when an ex-employee applies to another company, the employee's former employer can provide access to their employment background as shown by process 2. As shown by process 1, the employer may provide server 18 the employment background for encryption and certification. In another example embodiment, the employer can issue a digitally signed document verifying the employee's work history and in the instance the employee applies for a new job at a new employer, the employee may submit the digital degree and work history to the new employer with confidence because the new employer can easily check the issuing parties via various embodiments discussed herein. As such, time-consuming background checks can be avoided. Once the employment documentation is encrypted and stored to the server 18, the server 18 may be configured to provide encryption and permission services as described herein. The new employer may request permission to access the employment documentation to which the employee must grant permission as shown by process 3. The server 18 may further request payment from the new employer to access the employment documentation as shown by process 4. Once permissions are verified according to the processes discussed herein and the payment has been verified, the new employer may be provided with access to the employment documentation. Other example use cases may relate to credit checks where consumers can send digital copy of their credit score to loan companies directly because the loan company can verify the authenticity of the document using the invention discussed herein.

After encrypting data using multiple keys, a user device may utilize the system for a myriad of use cases, for example, a user device configured to capture a parseable image to identify encoded visual indicia, the encoded visual indicia comprises a QR code. The QR code may be used to identify sensitive data saved to the system. For example, during a traffic stop, a police officer may request a driver's license from a driver. In this example, the driver may provide a QR code for the police officer's device to scan. Upon scanning the QR code, a permission request may be requested to the driver which may be identified by a random number shown on the driver's device. At the same time, the system may send the same random number to the police officer's device to which the driver can compare the two numbers. In an instance the numbers match, the driver may provide his or her permission (e.g., transmit the driver's user-specific public encryption key to the system). Similar to the decryption process disclosed herein, the driver's user-specific public encryption key is used to decrypt the server encryption key set used to decrypt the encrypted driver's license. The system may then transmit the decrypted driver's license to the police officer. Additionally or alternatively, the system may provide a user-specific encryption key to the police officer to be used to access the decrypted driver's license. This new user-specific encryption key transmitted to the police officer may be configured to expire in a specified amount of time, expire after a predetermined number of permitted accesses, or the new user specific encryption key may be valid until cancelled or revoked by the system as permitted by the data owner.

Example User Interfaces

FIGS. 11, 12, 13, 14, 15, 16, 17, 18, and 19 show example displays that may be presented by one or more display screens of one or more computing devices (e.g., user computing devices) for implementing an example configuration according to various embodiments. For example, display 1100 of FIG. 11 is shown as providing the user Jane Smith the ability to search for proof of employment via a search input graphical element 1101. Once the user enters search criteria (e.g., employee's SSN), the search results 1102 are presented on display 1100. For each search result, the display 1100 provides actions such as to forward the proof of employment, copy the proof of employment, manage viewing or access permissions, delete the proof of employment, and/or the like. The display 1100 further provides the action of creating a new proof of employment 1103.

Figure 12:

In one example, the display 1200 of FIG. 12 is shown as including a series of fields enabling the user to initiate the creation of a proof of employment. In this example, the user Jane Smith is a past employer of John McClane who may be requesting a sealed (digitally signed) proof of employment. For example, the display 1200 may be configured for receipt of user input selecting a new sealed proof of employment 1204. Upon selection to create a new sealed document or asset, in this case, proof of employment, the user Jane Smith may enter personal details of past employee John McClane 1202. As shown by 1201, the display may allow the user Jane Smith to add selected documents providing the proof of employment into the envelope. The display 1200 provides an action to seal and certify the envelope comprising the proof of employment documentation 1203. The display further provides for transmitting the sealed proof of employment to the employee, for example to a user computing entity associated with the employee. The employee may then transmit (via the user computing entity) the sealed proof of employment to other users (e.g., a prospective new employer) to access the sealed data.

Figure 14:
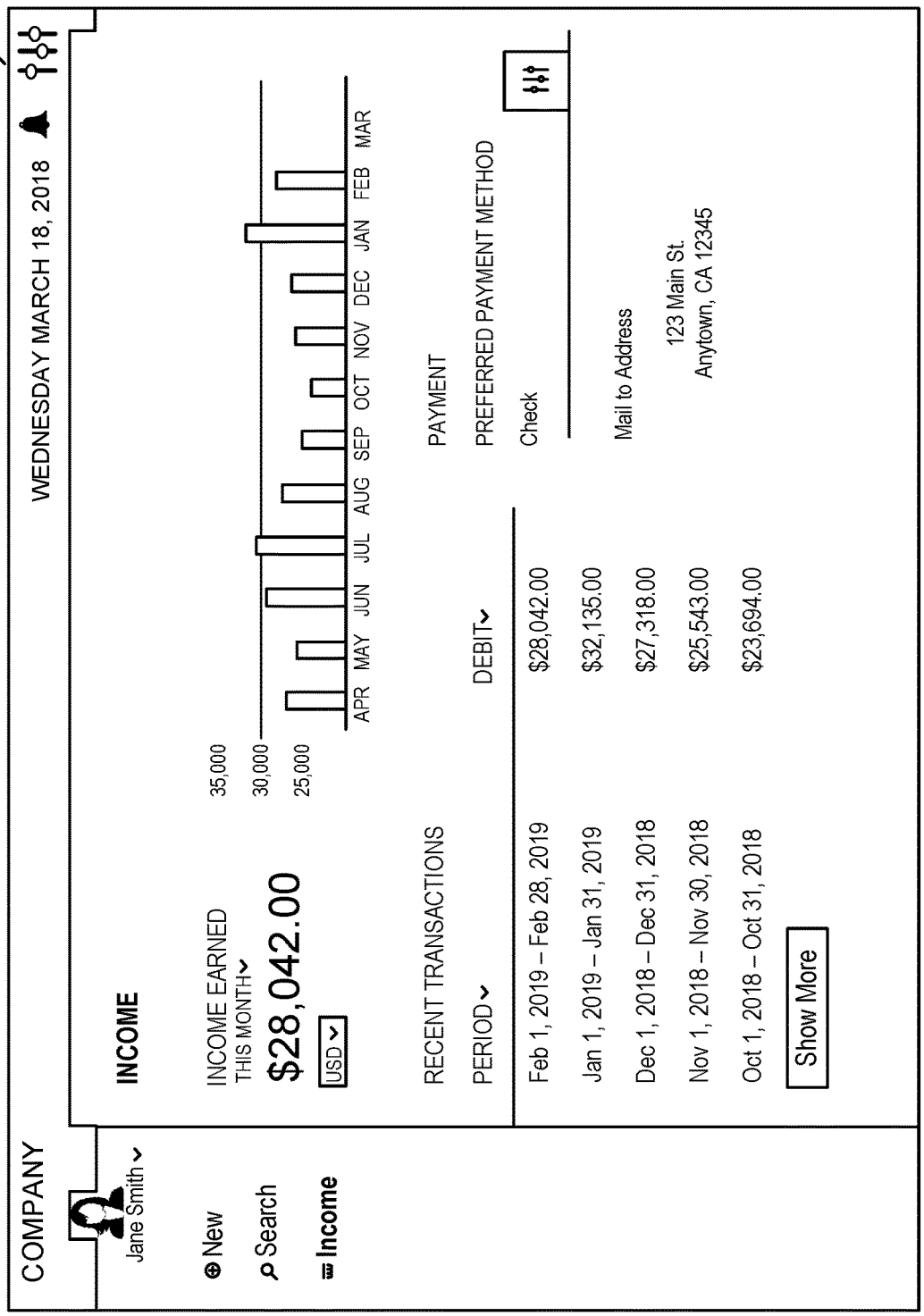

The display 1300 of FIG. 13 is shown as including confirmation of the sealed proof of employment comprising the personal details 1301 and a certification 1302. Display 1300 may further provide options to email the past employer 1303 or provide/copy access 1304 to the sealed proof of employment. In certain embodiments, employee work history may be made available by a prior employer of an employee to a potential future employer of the employee at a charge, such that access to the employee's work history is only granted upon confirmation of payment by the future employer. Certain embodiments provide a dashboard screen, such as display 1400 of FIG. 14 showing an amount of income produced for the previous employer in providing work history information for previous employees.

Figure 15:
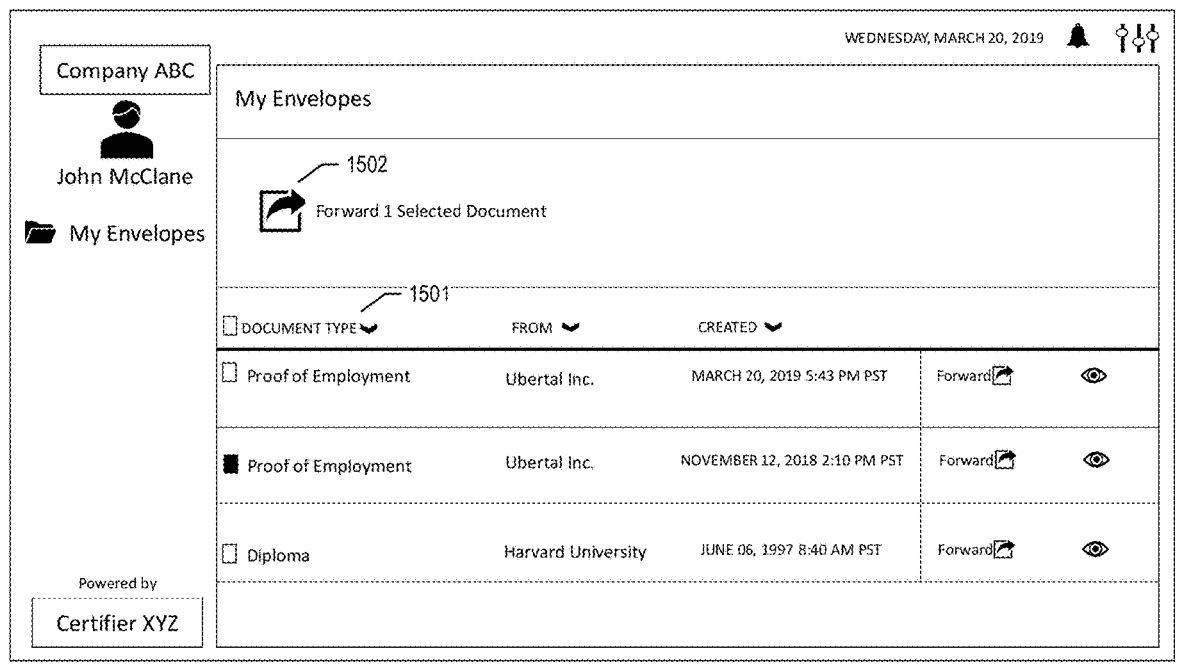

In another example embodiment, the display 1500 of FIG. 15 is shown in which employee John McClane may view a list of sealed assets he owns. As shown in 1501, the list includes proof of employment, created at two different timestamps, and a diploma. The display 1500 of the illustrated example provides the user with an option to forward at least one selected sealed asset 1502 such as, the most recent proof of employment.

Figure 16:
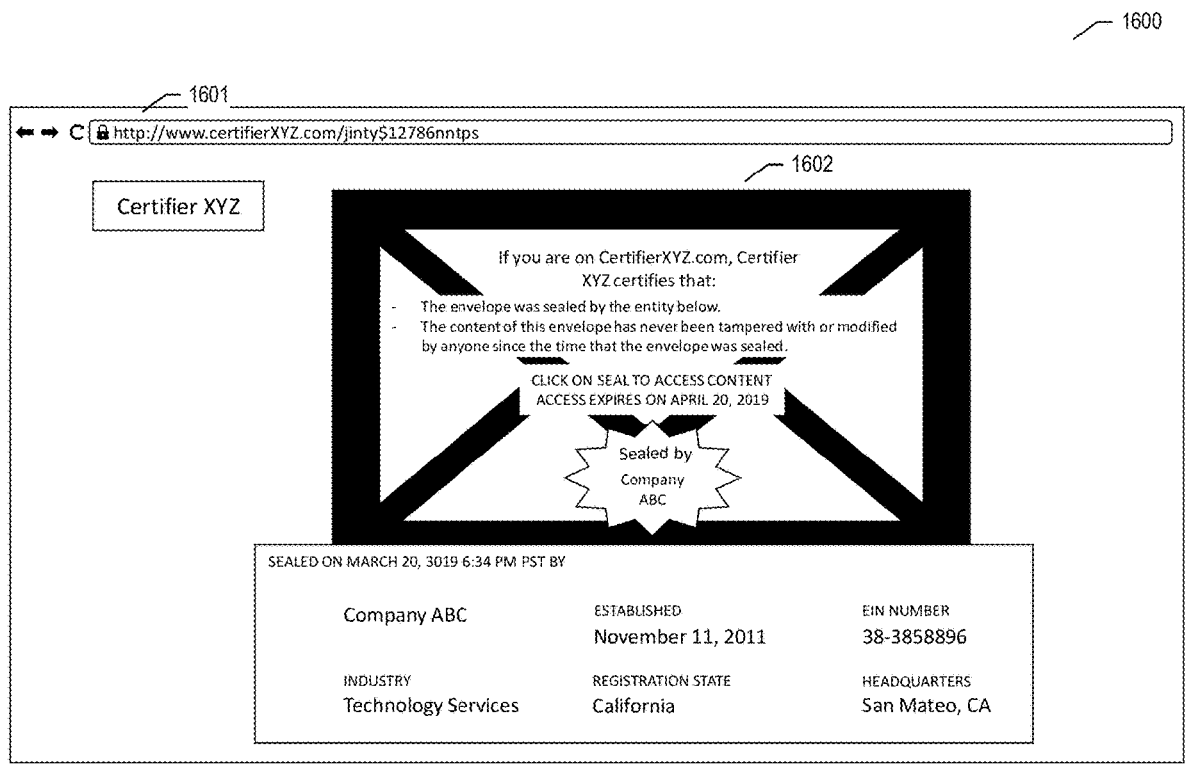

As shown by display 1600 of FIG. 16, a recipient of the sealed asset transmittal may be provided with a link 1601 to access the sealed asset. The display 1600 is shown as including the envelope (e.g., sealed asset) with information 1602 comprising one or more of: the certifier, the entity, a date of when the seal was established, a unique seal ID, and/or the like. The display 1600 comprising the envelope provides confirmation that the envelope was sealed by the entity below and that contents of the envelope have not been tampered with or modified by anyone since the time that the envelope was sealed as verified by the certifier.

Figure 17:
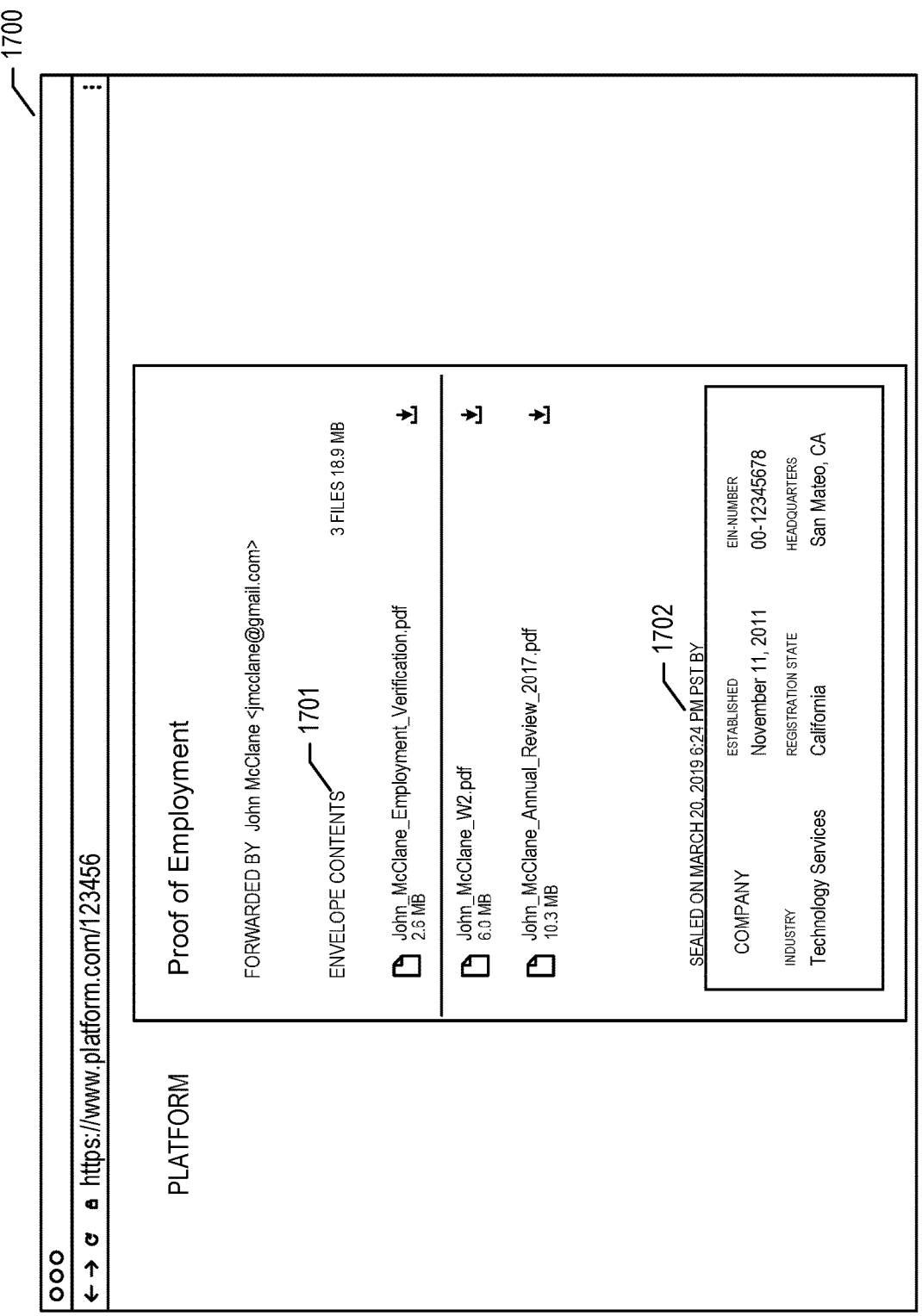

Display 1700 of FIG. 17 shows another detailed view of the contents of the sealed asset comprising John McClane's proof of employment, W2 tax form, and annual review 1701. The display 1700 further comprises confirmation 1702 that the envelope was sealed by the entity below and that contents of the envelope have not been tampered with or modified by anyone since the time that the envelop was sealed as verified by the certifier.

Figure 18:
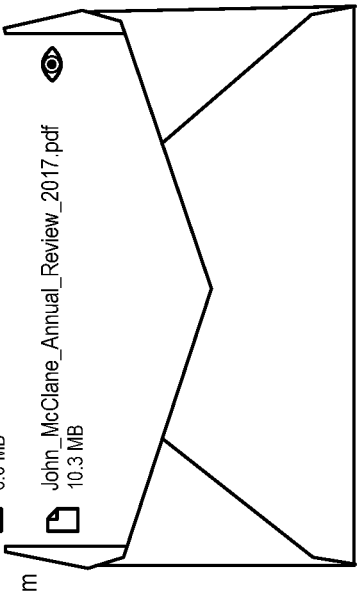

Display 1800 of FIG. 18 provides permissions and access status of John McClane's proof of employment, W2 tax form, and annual review. History 1802 shows a timestamp indicating when his employment documentation was access and by whom. The display 1800 provides information when the employment documentation was created 1801 and the certifier as well as content of the envelope 1803.

Figure 19:
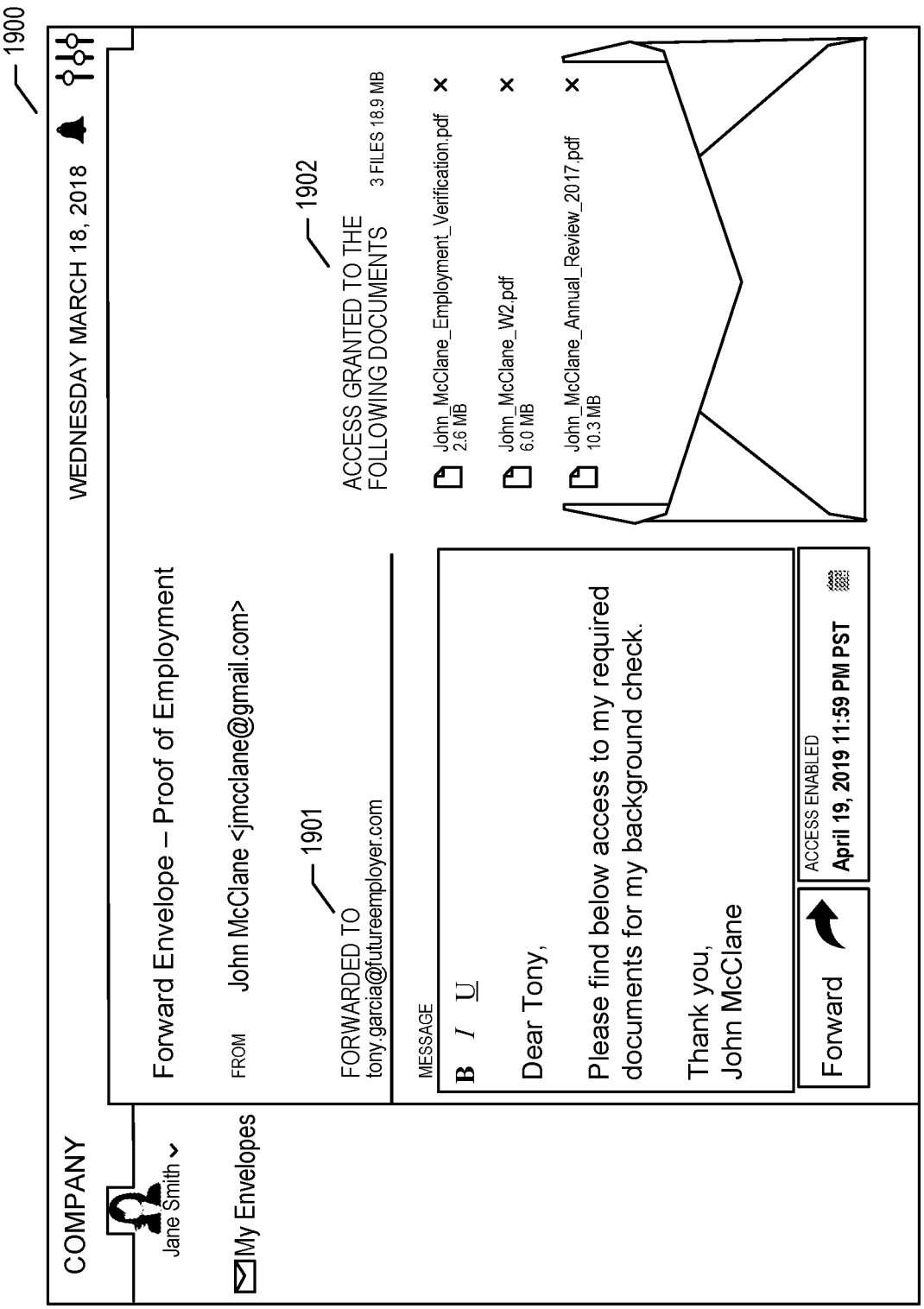

As shown by display 1900 of FIG. 19, John McClane may be provided with the option to forward 1901 the employment documentation to the potential employer. Display 1900 further provides John McClane details on the content of the envelope 1902.

It is noted that all or some of the information presented by the example displays discussed herein may be based on data that is received, generated and/or maintained by one or more components of the system.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus for providing decrypted data, the apparatus comprising:
at least one processor; and
at least one non-transitory memory storing instructions that, when executed by the processor, configure the apparatus to:
receive, from a first computing device, a data decrypt request to decrypt encrypted data, the data decrypt request comprising a user key;
determine that the user key is associated with a key hierarchy that comprises a server key;
decrypt the server key using the user key;
decrypt the encrypted data using the decrypted server key;
permit access to the decrypted data by the first computing device;
determine that the user key is associated with the key hierarchy that comprises the server key and at least a second key associated with a second user;
receive, from a second computing device associated with the second user, a second data decrypt request to decrypt the encrypted data;
receive from the second computing device, the second key; and
decrypt the server key using the second key.

2. The apparatus of claim 1, wherein the at least one non-transitory memory stores instructions that, when executed by the processor, further configure the apparatus to:
determine that the user key is associated with the key hierarchy that comprises the server key and a plurality of other keys associated with the user; and
decrypt the server key using the user key or at least one of the plurality of other keys associated with the user.

3. The apparatus of claim 1, wherein the at least one non-transitory memory stores instructions that, when executed by the processor, further configure the apparatus to:
receive, from the first computing device, a password associated with the first computing device;
derive the user key from the password;
determine that the password derived user key is associated with the key hierarchy that comprises the server key; and
decrypt the server key using the password derived user key.

4. The apparatus of claim 1, wherein the at least one non-transitory memory stores instructions that, when executed by the processor, further configure the apparatus to:
responsive to receiving, from the first computing device, the data decrypt request to decrypt encrypted data, transmit an authentication question to the first computing device;
receive a reply to the authentication question;
compare the reply to a corresponding answer; and
responsive to the reply matching the corresponding answer, derive the user key from the answer;
determine that the answer derived user key is associated with the key hierarchy that comprises the server key; and
decrypt the server key using the answer derived user key.

5. The apparatus of claim 1, wherein the at least one non-transitory memory stores instructions that, when executed by the processor, further configure the apparatus to:
permit access to the decrypted data based upon a time period falling within an allowed time period of an access rule.

6. The apparatus of claim 1, wherein the at least one non-transitory memory stores instructions that, when executed by the processor, further configure the apparatus to:
permit access to the decrypted data based upon one or more access rules, wherein the one or more access rules indicate a maximum number of access requests permitted within a predetermined period of time.

7. A computer implemented method for providing decrypted data, the computer implemented method comprising:
receiving, from a first computing device, a data decrypt request to decrypt encrypted data, the data decrypt request comprising a user key;

determining that the user key is associated with a key hierarchy that comprises a server key;
decrypting the server key using the user key;
decrypting the encrypted data using the decrypted server key;
permitting access to the decrypted data by the first computing device;
determining that the user key is associated with the key hierarchy that comprises the server key and at least a second key associated with a second user;
receiving, from a second computing device associated with the second user, a second data decrypt request to decrypt the encrypted data;
receiving from the second computing device, the second key; and
decrypting the server key using the second key.

8. The computer implemented method of claim 7, further comprising:
determining that the user key is associated with the key hierarchy that comprises the server key and a plurality of other keys associated with the user; and
decrypting the server key using the user key or at least one of the plurality of other keys associated with the user.

9. The computer implemented method of claim 7, further comprising;
deriving the user key from a password;
determining that the password derived user key is associated with the key hierarchy that comprises the server key; and
decrypting the server key using the password derived user key.

10. The computer implemented method of claim 7, further comprising;
receiving a reply to an authentication question;
comparing the reply to a corresponding answer; and
responsive to the reply matching the corresponding answer, deriving the user key from the answer;
determining that the answer derived user key is associated with the key hierarchy that comprises the server key; and
decrypting the server key using the answer derived user key.

11. The computer implemented method of claim 7, further comprising:
permitting access to the decrypted data based upon a time period falling within an allowed time period of an access rule.

12. The computer implemented method of claim 7, further comprising:
permitting access to the decrypted data based upon one or more access rules, wherein the one or more access rules indicate a maximum number of access requests permitted within a predetermined period of time.

13. A computer program product for providing decrypted data, the computer program product comprising at least one non-transitory computer-readable storage medium having computer-executable program code instructions stored therein, the computer-executable program code instructions, in execution with a processor, configured to:

receive, from a first computing device, a data decrypt request to decrypt encrypted data, the data decrypt request comprising a user key;
determine that the user key is associated with a key hierarchy that comprises an server key;
decrypt the server key using the user key;
decrypt the encrypted data using the decrypted server key;
permit access to the decrypted data by the first computing device;
determine that the user key is associated with the key hierarchy that comprises the server key and at least a second key associated with a second user;
receive, from a second computing device associated with the second user, a second data decrypt request to decrypt the encrypted data;
receive from the second computing device, the second key; and
decrypt the server key using the second user key.

14. The computer program product of claim 13, wherein the computer-executable program code instructions, in execution with a processor, are further configured to:
determine that the user key is associated with the key hierarchy that comprises the server key and a plurality of other keys associated with the user; and
decrypt the server key using the user key or at least one of the plurality of other keys associated with the user.

15. The computer program product of claim 13, wherein the computer-executable program code instructions, in execution with a processor, are further configured to:
receive, from the first computing device, a password associated with the first computing device;
derive the user key from the password;
determine that the password derived user key is associated with the key hierarchy that comprises the server key; and
decrypt the server key using the password derived user key.

16. The computer program product of claim 13, wherein the computer-executable program code instructions, in execution with a processor, are further configured to:
responsive to receiving, from the first computing device, the data decrypt request to decrypt encrypted data, transmit an authentication question to the first computing device;
receive a reply to the authentication question;
compare the reply to a corresponding answer; and
responsive to the reply matching the corresponding answer, derive the user key from the answer;
determine that the answer derived user key is associated with the key hierarchy that comprises the server key; and
decrypt the server key using the answer derived user key.

17. The computer program product of claim 13, wherein the computer-executable program code instructions, in execution with a processor, are further configured to:
permit access to the decrypted data based upon a time period falling within an allowed time period of an access rule.

* * * * *